United States Patent [19]
Wildenaur

[11] 4,239,436
[45] Dec. 16, 1980

[54] WAREHOUSING APPARATUS FOR MOVING GOODS

[76] Inventor: Anton Wildenaur, Bergheidengasse 8/3/2, A-1130-Wien, Austria

[21] Appl. No.: 895,052

[22] Filed: Apr. 10, 1978

Related U.S. Application Data

[63] Continuation of Ser. No. 604,533, Aug. 14, 1975, abandoned, which is a continuation-in-part of Ser. No. 511,279, Oct. 2, 1974, abandoned, which is a continuation of Ser. No. 224,662, Feb. 9, 1972, abandoned.

[30] Foreign Application Priority Data

Feb. 9, 1971 [DE] Fed. Rep. of Germany ....... 2106053
Mar. 2, 1971 [DE] Fed. Rep. of Germany ....... 2109832

[51] Int. Cl.³ .................... B65G 65/00; B65G 1/06
[52] U.S. Cl. ................................ 414/276; 198/750; 198/766; 198/768; 221/289; 414/278; 414/280; 414/283
[58] Field of Search ............ 198/750, 766, 768; 414/222-223, 249, 267, 269, 273-287, 331, 351; 221/289-290

[56] References Cited

U.S. PATENT DOCUMENTS

| 588,297 | 8/1897 | Thompson | 198/766 X |
| 2,791,338 | 5/1957 | St. Andre | 414/257 |
| 2,899,086 | 8/1959 | St. Andre | 414/232 |
| 2,926,815 | 3/1960 | Laughter | 221/289 |
| 3,212,630 | 10/1965 | Allen et al. | 198/768 |
| 3,486,608 | 12/1969 | Rogers | 198/750 |
| 3,549,025 | 12/1970 | Messner | 414/282 |
| 3,610,445 | 10/1971 | Kitchen et al. | 414/276 |
| 3,750,804 | 8/1973 | Lemelson | 414/276 |

FOREIGN PATENT DOCUMENTS

| 1296087 | 5/1969 | Fed. Rep. of Germany | 198/750 |
| 428348 | 12/1947 | Italy | 198/766 |

Primary Examiner—Stephen G. Kunin
Assistant Examiner—R. B. Johnson
Attorney, Agent, or Firm—Toren, McGeady and Stanger

[57] ABSTRACT

In a warehouse setup, individual items of goods are moved onto and off of storage shelves on a rack by a vibrating action. A movable carriage supporting a vibrator is positionable at the ends of a storage shelf so that the vibrator can be placed in engagement with a particular shelf. The shelves are movably supported relative to the rack whereby the vibrating action is directed to the shelf but not to the rack.

4 Claims, 9 Drawing Figures

WAREHOUSING APPARATUS FOR MOVING GOODS

CROSS-REFERENCE TO RELATED APPLICATIONS

This is a continuation of application Ser. No. 604,533 filed Aug. 14, 1975, now abandoned, which in turn was a continuation-in-part of Ser. No. 511,279 filed Oct. 2, 1974, now abandoned, which in turn was a continuation of Ser. No. 224,662 filed Feb. 9, 1972, now abandoned.

BACKGROUND OF THE INVENTION

The present invention is directed to warehousing apparatus for moving goods onto and off of storage shelves and, more particularly, it is directed to a movably supported vibrator positionable into contact with a storage shelf for vibrating the shelf and causing items of goods to move along the shelf.

A variety of devices are known for moving goods along a storage shelf. In one such device the goods are shelved on storage belts and when the belts are not in motion they serve as storage space for the goods. Usually each conveyor belt has its own drive which is controlled automatically. By driving the conveyor belt goods can be loaded onto or unloaded from the belt. While such an arrangement is effective, the structure of the conveyor belt and its associated drive make the device quite expensive. Further, the conveyor belts and their drives require a relatively large amount of space and are very heavy.

Another storage device operates on the principle of automatic vending machines. The weight of the individual items of goods causes them to move along guideways. At the lower or unloading end of such guideways, a barrier is positioned to control the unloading operation. The barrier can be automatically operated from a remote location. However, such devices are not suitable for goods of different sizes stored in the same guideway. Furthermore, such devices are usable only with goods which can be stacked and can withstand a certain amount of pressure.

Still another type of storage shelves involves the use of rolls over which the goods slide by gravity. Such devices have the disadvantage that the ability of the goods to move over the rolls depends on the weight of the goods and the amount loaded onto the rolls. Because of the variation in speed with which different types of goods move over the rolls, automatic counting of individual items of the goods is made more difficult. If the surface of the goods contacting the rolls is not even, difficulty is experienced in moving the goods over the rolls. The initial cost and upkeep on such storage facilities is expensive.

SUMMARY OF THE INVENTION

It is a primary object of the present invention to provide an efficient apparatus for loading goods onto a storage shelf, for moving the goods along the shelf and for unloading them from the shelf. Unlike certain of the known devices where separate driving means are required for each storage shelf, in the present invention a single drive mechanism can be used for each of the storage shelves.

In accordance with the present invention, the storage shelves are supported on a rack so that the shelves can be moved relative to the rack. A movable carriage is arranged for movement into contact with one or both of the opposite ends of the shelves. A vibrator is mounted on the carriage and is positionable into contact with the shelf for imparting a vibrating action which effects the movement of the goods onto the shelf, the movement of the goods along the shelf and finally the movement of the goods off the shelf. The movable carriage also includes a stabilizing member for interconnecting the rack to the carriage so that the vibrating action transmitted to the shelf does not have a disadvantageous effect on the rack. Conveyors can be connected to the movable carriage for supplying goods to and removing them from the shelves.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive material in which there are illustrated and described preferred embodiments of the invention.

DETAIL DESCRIPTION OF THE INVENTION

Figure 1:
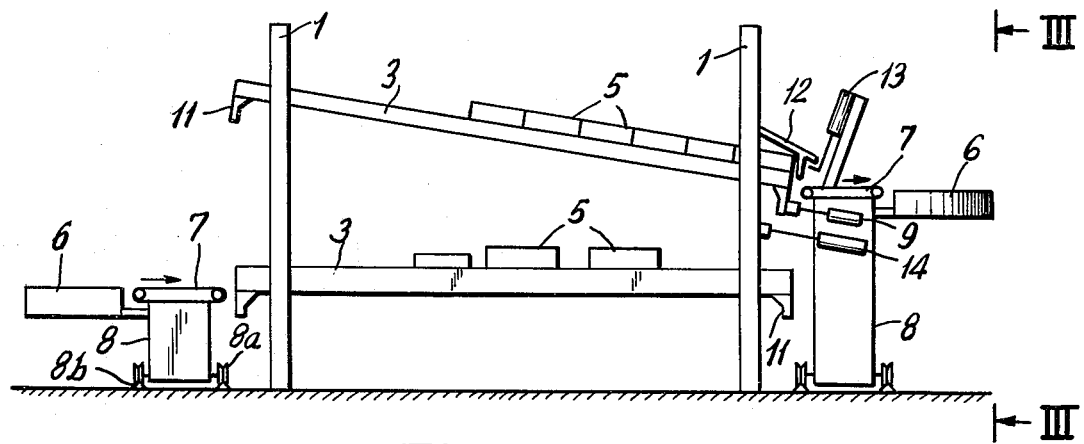
FIG. 1 is a schematic side elevational view of warehousing apparatus incorporating the present invention with the view being taken along the lines I—I in FIGS. 2 and 3.

In FIGS. 1–6 warehouse apparatus is shown including a support rack 1 consisting of vertical posts 1 and horizontal beams 2 extending transversely between a pair of posts. Shelves 3 are supported on the rack and they rest on the beams 2. However, the shelves are not fixed to the beams, rather they are supported on rollers 4 mounted on the beams, note FIG. 4, so that the shelves can be moved relative to the vertical posts and horizontal beams forming the rack. One of the shelves 3 is shown in a horizontal position while the other shelf is shown inclined downwardly from its inlet end at the left-hand side of FIG. 2 to its outlet end at the right-hand side of FIG. 1. Individual parcels or items of goods 5 are shown resting on the shelves.

Figure 2:
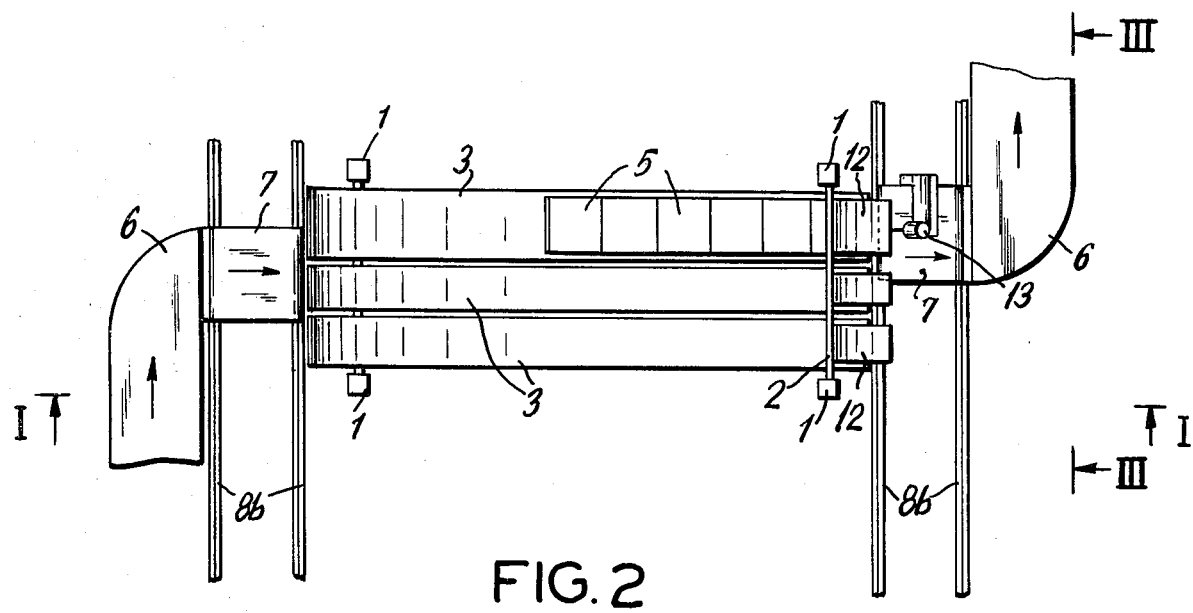
FIG. 2 is a schematic plan view of the apparatus shown in FIG. 1.
Figure 3:
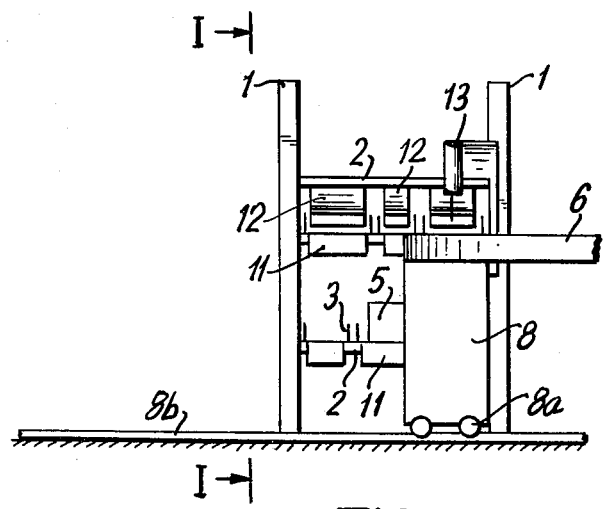
FIG. 3 is an end elevational view of the apparatus shown in FIG. 1 taken along the lines III—III in FIGS. 1 and 2.

At each end of the rack, a transfer surface 7 is located at the upper end of a movable carriage 8. Conveyors 6 are arranged to deliver items of goods 5 to the left-hand support surface 7 and to remove items of goods from the right-hand support surface 7 after the goods have moved along the shelves from the inlet end to the outlet end. The movable carriages 8 are supported on flanged wheels 8a which ride on rails 8b so that the movable carriage can be selectively positioned opposite an end of one shelf 3 for moving the goods onto or off of the shelf. As can be seen in FIGS. 2 and 3 there are three shelves extending in side-by-side relation across the rack. The carriage 8 on the left-hand side of FIG. 2 is located at the inlet end of the middle shelf 3 while the carriage 8 on the right-hand side is aligned opposite the outlet end of one of the outside shelves. In FIG. 2 the arrows indicate the direction of movement of the goods onto and off of the shelves. In addition to being movable in the horizontal direction over the rails 8b, the movable carriages 8 are also movable in the vertical direction to be aligned with the adjacent ends of the shelves in the upper and lower rows of the shelves.

Figure 4:
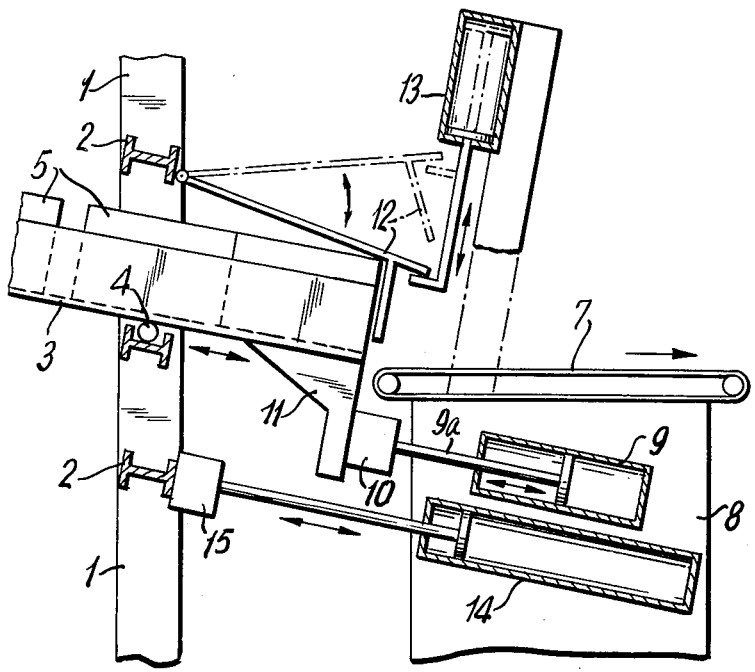
FIG. 4 is an enlarged portion of a part of the apparatus shown in FIG. 1.

Attached to the carriage 8 below its transfer surface 7 is a vibrator 9 in the form of a piston assembly operated pneumatically or hydraulically. As shown in FIG. 4, the piston rod 9a of the vibrator 9 extends toward the outlet end of the adjacent shelf and it has a contact member 10 shown in engagement with a projection 11 extending downwardly from the shelf 3. As the piston assembly or vibrator 9 is operated, the member 10 reciprocates and contacts the projection 11 on the shelf transmitting the vibrating action to the shelf so that the individual items of goods 5 move downwardly toward the outlet end. However, as shown in full lines in FIG. 4, a barrier 12, pivotally mounted on one of the beams 2 extends downwardly across the outlet end of the shelf blocking any movement of individual items of the goods onto the transfer surface 7. A release member 13 extends upwardly from the movable carriage 8 and is arranged to move in the direction of the arrow shown in FIG. 4 so that as it is moved from the full line position into the dashed line position it lifts the barrier member 12 from in front of the outlet end of the shelf. When this occurs, the vibrating action transmitted to the shelf causes the goods 5 to move onto the transfer surface 7 and, due to the continued movement of the goods, onto the conveyor 6 for movement in the direction of the arrows shown in FIGS. 2 and 6.

On the movable carriage 8 below the vibrator 9, a stabilizer device 14 is provided also in the form of a piston assembly. As with the vibrator, the piston assembly is movable toward the rack and effects a holding action either with the post 1 or beam 2 to limit any transmission of the vibrating effect into the rack. In FIG. 4, a coupling 15 is provided on the stabilizer member and is in the form of a magnet which bears against the beam 2.

While the illustration in FIG. 4 indicates the vibration being applied to the outlet end of one of the shelves 3 for providing both movement along the shelf and unloading, a similar vibratory effect can be applied to the opposite end of the shelf. Note in FIG. 1 that a similar projection 11 extends downwardly from the shelf 3 for engagement by the vibrator on the movable carriage at the inlet end of the shelves. For purposes of simplicity in the illustration the vibrator is not shown on the movable carriage on the left-hand end of FIG. 1. Further, though the vibratory action is shown being applied to the inclined shelf 3, a similar vibratory action could be applied to the horizontal shelf for effecting the movement of the items of goods over the shelf.

Figure 5:
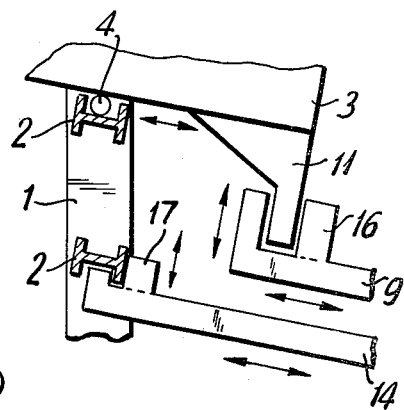
FIG. 5 is a view similar to FIG. 4, however, showing another embodiment of a portion of the apparatus shown in that figure.
Figure 6:
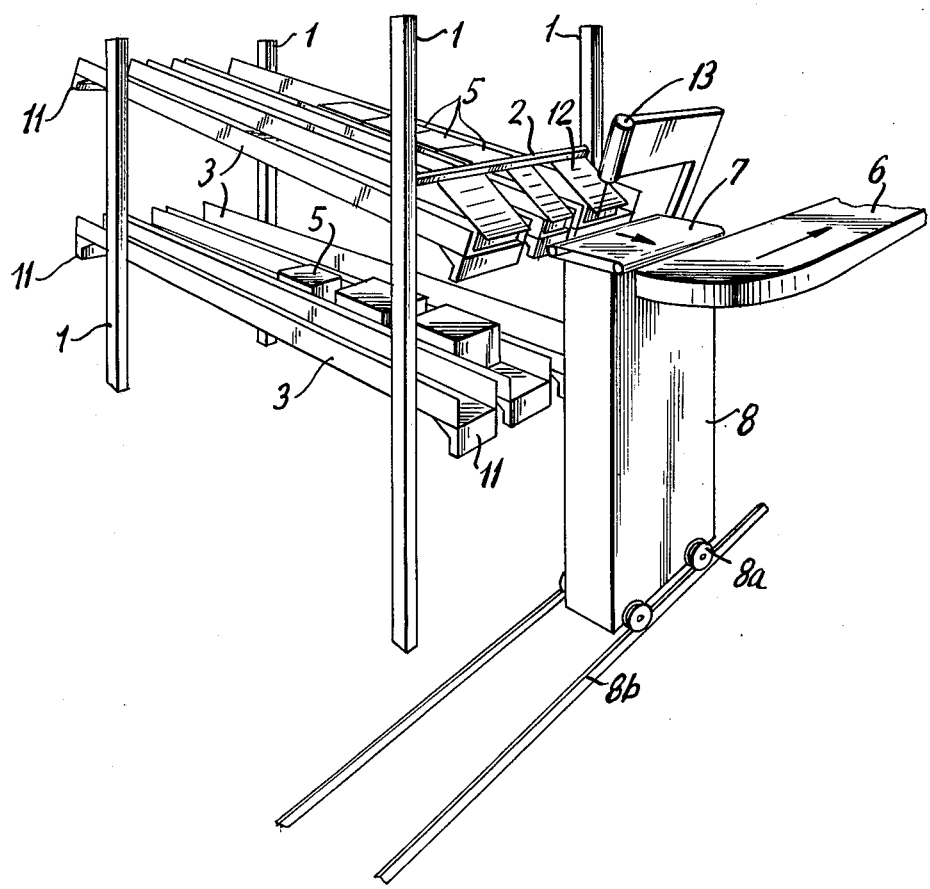
FIG. 6 is a schematic perspective view of the apparatus shown in FIG. 1.

In FIG. 5 an alternate arrangement of the vibrator 9 and stabilizer member 14 are shown where the ends are each provided with a forked shaped member 16, 17 engageable with the projection 11 and the beam 2, respectively. While the forked shaped member 16 transmits the vibrating action to the shelf through the projection 11 the forked shaped member 17 provides the holding action for the stabilizer member on the beam 2. The direction of movement of the vibrator 9 and stabilizer member 14 is shown by the arrows in FIG. 5. The vertical arrows indicate the manner in which the two members can be moved into contact with the projection 11 and the beam 2.

The movable carriage 8 is shown in FIGS. 1 to 6 as supported on rails, however, a variety of other movable supports could be used, such as a lift truck or other device.

While the movable carriages carrying the vibrators 9 are shown on each end of the shelves it is possible to provide the vibrating action on just one end of the shelf and by the manner in which the vibration is applied affording the desired movement of the goods over the shelf.

Figure 7:
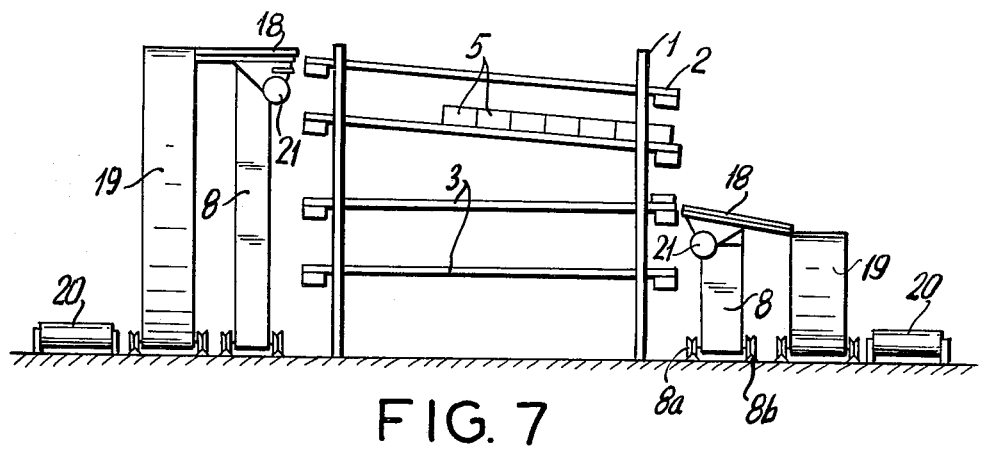
FIG. 7 is a schematic side view of another embodiment of the present invention.
Figure 8:
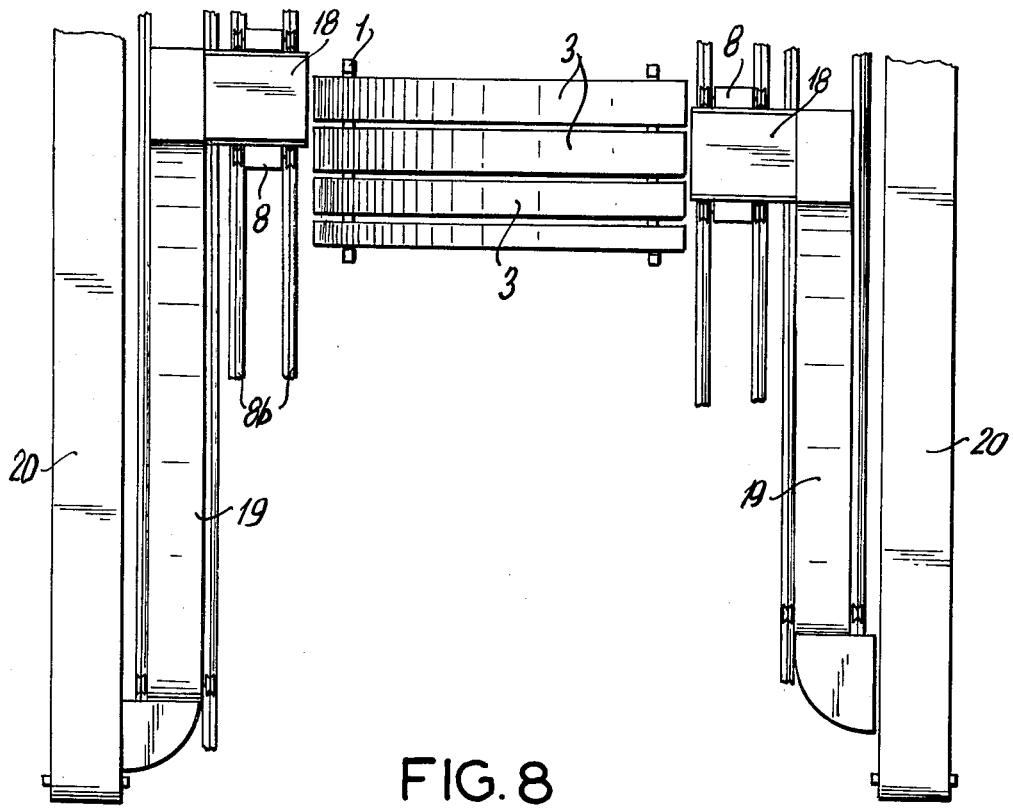
FIG. 8 is a plan view of the apparatus shown in FIG. 7.
Figure 9:
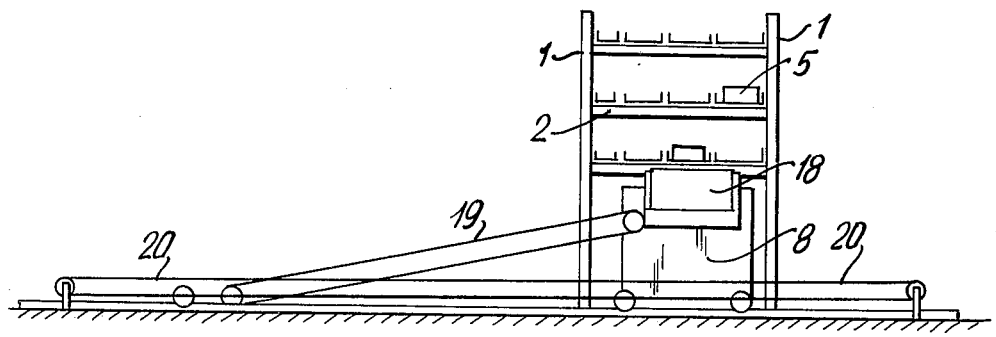
FIG. 9 is an end view of the apparatus shown in FIG. 7.

In FIGS. 7, 8 and 9 another arrangement of the apparatus is shown in which similar parts bear the same reference numerals.

In FIGS. 7, 8 and 9 a rack is illustrated formed of vertical posts 1 interconnected by horizontal beams 2. Shelves 3 are movably supported on the beams 2 in much the same manner as shown in FIG. 4. Individual parcels or items of goods 5 are shown supported on the shelves. In FIG. 7 the lower shelves 3 are arranged horizontally while the upper shelves are inclined downwardly from left to right. For simplicity's sake, the movable carriage 8 is shown without the vibrator 9 and the stabilizer member 14. As with the embodiment shown in FIGS. 1 to 6, the movable carriage 8 is supported on flange wheels 8a which ride on rails 8b.

The movable carriages 8, as is in the other embodiment previously described, are movable not only horizontally over the rails but also in the vertical direction so that the upper end of the carriage can be brought to the same level as the various shelves 3. A transfer surface 18 is located on top of the movable carriages and extends from the adjacent end of a shelf to a conveyor 19. The conveyors 19 are also adjustable in the vertical direction and provide a downwardly inclined ramp from the upper end of the movable carriage 8 to another conveyor 20. The conveyors 19 and 20 are also movably supported on rails so that they can be positioned along with the movable carriage.

The transfer member 18 is provided with drive means so that it acts as an accelerator in transferring items of goods 5 from the shelves to the conveyors 19. The transfer action by the member 18 can be provided by a continuous belt or similar moving devices.

Associated with the top of each movable carriage 8 is a optical system 21 which is arranged to register the movement of goods onto or off of the shelves and also to indicate the presence of goods on the shelves. Such optical systems are well known, accordingly, no further description is considered necessary.

As can be seen in FIG. 9, the conveyor 19 is pivotally mounted at its ends for varying its angle of inclination as the movable carriage 8 is positioned vertically opposite one of the shelves 3.

Though not shown in FIGS. 7–9, barriers can be positioned at the ends of the shelves 3 to prevent the goods from being displaced from the ends.

While specific embodiments of the invention have been shown and described in detail to illustrate the application of the inventive principles, it will be understood that the invention may be embodied otherwise without department from such principles.

What is claimed is:

1. Warehousing apparatus comprising a support rack, said rack comprising spaced vertical posts and horizontal beams supported on and extending between said posts, elongated shelves each having a first end and a second end spaced from the first end in the elongated direction of said shelves, said shelves supported on said horizontal beams at horizontally spaced positions, said shelves arranged for supporting and storing individual and separate items of goods, wherein the improvement comprises first means supported on said horizontal beams at the support positions for said shelves for supporting said shelves in a movable condition so that said shelves can be slidably displaced relative to said rack and to said first means while remaining in the supported condition, said first means comprises rollers mounted on said horizontal beams and supporting said shelves at positions spaced between the first and second ends of said shelves so that said shelves can be slidably moved relative to said rollers and to said rack, second means selectively displaceably positionable into operative engagement with at least certain ones of said shelves for moveably displacing the selected said shelf in the supported position in the elongated direction thereof in a reciprocating manner for moving items of goods located on the selected said shelf between the first and second ends thereof, said second means including a movable carriage for supplying items of goods to and removing items of goods from the first and second ends of said shelves, a vibrator, said moveable carriage supporting said vibrator for positioning said vibrator at one end of one of said shelves, said vibrator having a contact member displaceable into contact with the shelf for transmitting the vibratory movement to the shelf and displacing the items of goods thereon between the first and second ends thereof, a stabilizer member attached to said moveable carriage and moveable into engagement with said rack for securing said rack and moveable carriage together to limit the movement of said rack and carriage due to the vibratory action of said vibrator, said contact member of said vibrator comprising a piston assembly including a piston rod displaceable by fluid pressure into contact with the shelf to be vibrated, a shelf coupling attached to the end of said piston rod and arranged to engage said shelf to be vibrated, and said shelf having a downwardly extending projection at at least one of its first and second ends, and said shelf coupling comprising a fork-like member arranged to intermesh with said projection for transmitting the vibrating action to said shelf.

2. Warehousing apparatus, as set forth in claim 1, wherein said stabilizing member comprises a piston assembly including a piston rod displaceable by fluid pressure into contact with said rack, and a magnet attached to the other end of said piston rod directed toward said rack for effecting engagement with said rack.

3. Warehousing apparatus, as set forth in claim 1, wherein a barrier is movably supported on said rack at least at one of the first and second ends of one of said shelves and positionable between a first position where said barrier prevents items of goods from being displaced from the end of the shelf at which it is located and a second position where said barrier is moved so that items of goods can be moved from said shelf.

4. Warehousing apparatus, as set forth in claim 3, wherein a movable member is mounted on said movable carriage and is engageable with said barrier for moving said barrier between its first and second positions.

* * * * *

UNITED STATES PATENT OFFICE
CERTIFICATE OF CORRECTION

Patent No. 4,239,436     Dated Dec. 16, 1980

Inventor(s) Anton Wildenauer

It is certified that error appears in the above-identified patent and that said Letters Patent are hereby corrected as shown below:

In the heading of the Patent [76] should read as follows:

[76] Inventor: Anton Wildenauer , Bergheidengasse 8/3/2 A-1130-Wien, Austria

Signed and Sealed this

Third Day of March 1981

[SEAL]

Attest:

RENE D. TEGTMEYER

Attesting Officer     Acting Commissioner of Patents and Trademarks